(12) United States Patent
Dillon et al.

(10) Patent No.: US 6,726,884 B1
(45) Date of Patent: *Apr. 27, 2004

(54) FREE-STANDING INTERNALLY INSULATING LINER

(75) Inventors: Kenneth R. Dillon, White Bear Lake, MN (US); Richard P. Merry, White Bear Lake, MN (US); Stephen M. Sanocki, Stillwater, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/665,606

(22) Filed: Jun. 18, 1996

(51) Int. Cl.$^7$ .............................. B01D 53/34; F01N 3/28
(52) U.S. Cl. ........................ 422/179; 422/180; 422/221; 422/222
(58) Field of Search ............... 422/179, 180, 422/174, 221, 222, 199; 60/299, 300; 55/DIG. 30, 523, 488; 428/116, 593–594

(56) References Cited

U.S. PATENT DOCUMENTS

| | | | |
|---|---|---|---|
| 3,488,723 A | 1/1970 | Veazie | 252/62 |
| 3,801,289 A | 4/1974 | Wiley | 422/180 |
| 3,975,565 A | 8/1976 | Kendall | 156/148 |
| 3,996,145 A | 12/1976 | Hepburn | 252/62 |
| 4,002,433 A * | 1/1977 | Oser | 422/179 |
| 4,011,651 A | 3/1977 | Bradbury et al. | 29/424 |
| 4,181,514 A | 1/1980 | Lefkowitz et al. | 55/488 |
| 4,376,675 A | 3/1983 | Perrotta | 162/145 |
| 4,431,449 A | 2/1984 | Dillon et al. | 75/246 |
| 4,598,790 A * | 7/1986 | Uesugi | 181/252 |
| 4,693,338 A | 9/1987 | Clerc | 181/231 |
| 4,927,608 A * | 5/1990 | Worner et al. | 422/179 |
| 4,929,429 A | 5/1990 | Merry | 422/179 |
| 4,950,627 A * | 8/1990 | Tokarz et al. | 501/95.1 |
| 5,008,086 A * | 4/1991 | Merry | 422/179 |
| 5,028,397 A | 7/1991 | Merry | 422/179 |
| 5,404,716 A | 4/1995 | Wells et al. | 60/272 |
| 5,408,828 A | 4/1995 | Kreucher et al. | 60/299 |
| 5,419,127 A | 5/1995 | Moore, III | 60/322 |

FOREIGN PATENT DOCUMENTS

| | | |
|---|---|---|
| DE | 2 300 982 | 7/1974 |
| DE | 2 314 465 | 10/1974 |

(List continued on next page.)

OTHER PUBLICATIONS

Smook et al, Handbook for pulp & paper technologists, pp. 219–225, 1986.*

(List continued on next page.)

Primary Examiner—Hien Tran
(74) Attorney, Agent, or Firm—Brian E. Szymanski; Jean A. Lown

(57) ABSTRACT

An insulating liner for use with exhaust system or pollution control devices such as catalytic converters and diesel particulate filters or traps. The insulating liner is shown in relation to an end cone for use with a catalytic converter. The end cone includes an outer metallic end cone and a free-standing insulating cone positioned within the outer metallic end cone. A substantial portion of the inner surface of the insulating liner is exposed to hot exhaust gas from an internal combustion engine. The insulating liner is preferably formed of a composite containing inorganic fibers and/or particles, which makes the insulating liner rigid, yet capable of withstanding repeated mechanical and thermal shocks.

10 Claims, 3 Drawing Sheets

FOREIGN PATENT DOCUMENTS

| | | |
|---|---|---|
| DE | 3432283 A1 | 9/1984 |
| DE | 3626728 A1 | 8/1986 |
| DE | 3700070 A1 | 2/1987 |
| DE | 38309352 C1 | 8/1988 |
| EP | 0 352 246 | 1/1990 |
| EP | 0 643 204 A2 | 3/1995 |
| FR | 2 703 105 | 3/1993 |
| FR | 93 03533 | 9/1994 |
| GB | 1488649 | 10/1977 |
| GB | 2 143 902 A | 2/1985 |
| GB | 2 171 180 A | 8/1986 |
| WO | WO 91/19081 | 12/1991 |

OTHER PUBLICATIONS

ICI Chemicals & Polymers Limited, "Catalytic Converters—Refractory Fibre Retaining Blakets US 4,69,338 Validity," From M Dee to J Dinwoodie, Sep. 27, 1994, 4 pp.

* cited by examiner

FREE-STANDING INTERNALLY INSULATING LINER

BACKGROUND OF THE INVENTION

The present invention relates to exhaust system and pollution control devices, such as catalytic converters, diesel particulate filters or traps, exhaust pipes and the like. In particular, the invention relates to an internal insulating liner used in high temperature applications. The application describes the invention as it relates to an internally insulating end cone used to provide a transition from an exhaust pipe to the pollution control device. The end cone comprises a metal inlet or outlet cone housing with a free-standing fiber-based composite cone positioned within the metal cone housing. The internal fiber based cone does not require a protective metal internal cone housing.

Pollution control devices such as catalytic converters and diesel particulate filters or traps are well known, and are most typically used to purify the exhaust gasses produced by internal combustion engines. These types of pollution control devices typically comprise a metal housing with a monolithic element securely mounted within the casing by a resilient and flexible mounting mat.

Two types of devices are currently in wide spread use—catalytic converters and diesel particulate filters or traps. Catalytic converters contain a catalyst, which is typically coated on a monolithic structure mounted in the converter. Monolithic structures are typically ceramic, although metal monoliths have been used. The catalyst oxidizes carbon monoxide and hydrocarbons, and reduces the oxides of nitrogen in automobile exhaust gases to control atmospheric pollution. Diesel particulate filters or traps are wall-flow filters which have honeycombed monolithic structures typically made from porous crystalline ceramic materials. Alternate cells of the honeycombed structure are typically plugged such that exhaust gas enters one cell and is forced through the porous wall of one cell and exits the structure through another cell.

Due to the relatively high temperatures encountered in pollution control devices, it is important that the device be well insulated. Insulation is typically provided by securely mounting the monolithic element within the casing using an insulating mounting mat comprised of a suitable material. In addition, inlet and outlet cones which provide a transition from the exhaust pipe to the pollution control device are also insulated. The inlet and outlet end cones have previously been insulated by providing a double-walled end cone comprising an outer metal housing and an inner metal housing, with a gap defined between the inner and outer cone housings. A suitable insulating material fills the gap between the inner and outer cone housings. Examples of dual-wall end cones can be seen, for example, in U.S. Pat. No. 5,408,828 to Kreucher et al. Kreucher et al. shows the catalytic converter having a two-walled defuser leading from an exhaust pipe to the catalytic converter. A thermal insulating air barrier is provided between the inner wall and outer wall. Another example of double-walled end cones is seen in German Patent No. 3,700,070 A1 which shows an insulating mat placed between an outer and inner end cone.

The use of double-walled end cones has been required due to the nature of the insulating material used in pollution control devices. In particular, the use of low-density fibrous insulating materials requires an inner cone, because exposure to exhaust gases causes rapid erosion and destruction of the low-density fibrous insulating material. In addition, as it erodes the fibrous insulating material tends to clog the monolithic structure of the pollution control device and degrade its performance. Thus, the protective inner end cone was required to maintain the position and structural integrity of the insulating material. This is also true with other insulating materials which have been used as ceramic beads, such as shown in U.S. Pat. No. 5,419,127 to Moore, III. Moore shows an insulated exhaust manifold having a layer of insulating ceramic beads between an inner and outer exhaust manifold.

Although required for maintaining the position and structural integrity of the insulating layer of the inlet and outlet cones, the use of a protective metal inner cone has several disadvantages. In particular, use of an inner metal cone significantly increases the weight of the device, as well as the cost to manufacture the device. Therefore, what is needed is an insulating end cone which does not require use of a protective inner cone, and insulating material which is resistant to damage caused by exposure to hot exhaust gases and road shock.

SUMMARY OF THE INVENTION

The present invention provides a self-supporting insulating liner for use with exhaust systems and pollution control devices. The application describes the invention as it relates to an insulating end cone for use with pollution control devices such as catalytic converters and diesel particulate filters or traps. The end cone comprises an outer metallic end cone for connection to an exhaust system and a pollution control device. Within the outer end cone is an insulating cone positioned such that a substantial portion of the inner surface of the insulating cone is exposed to hot exhaust gases from the internal combustion engine, and the outer surface of the insulating cone is positioned adjacent the outer metallic end cone. The self supporting insulating liner thus eliminates the need for an inner metallic liner to protect the insulation. In a preferred embodiment, the insulating liner is formed of a composite material which utilizes glass or ceramic fibers mixed with a binder to create a rigid, yet shock resistant insulating end cone.

DETAILED DESCRIPTION OF THE PREFERRED EMBODIMENTS

Figure 1:
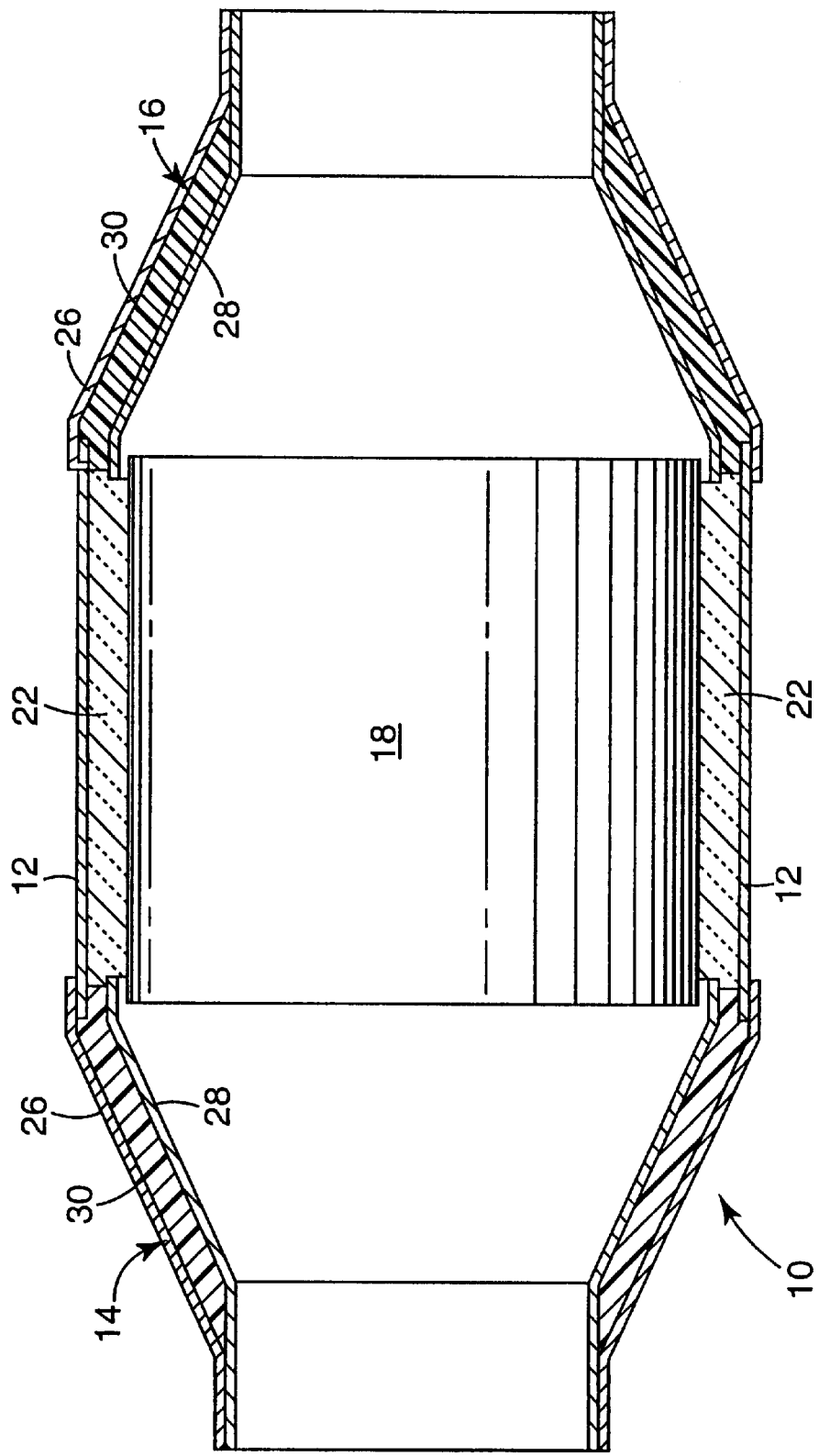
FIG. 1 shows a cross-sectional view of a prior art catalytic converter having inner and outer metallic end cones.

Referring now to the Figures, FIG. 1 shows a catalytic converter 10 typical of the prior art. Catalytic converter 10 comprises metal housing 12 with generally conical inlet 14 and outlet 16. The housing, which is also referred to as a can or a casing, can be made from suitable materials known in the art, and is typically made of metal. Preferably, the housing is made of stainless steel. Disposed within housing 12 is a monolithic catalytic element or monolith 18 formed of a honeycombed monolithic body either of ceramic or metal. The surrounding monolith 18 is a mounting and insulating mat 22.

Referring now to inlet 14 and outlet 16, it can be seen that inlet 14 and outlet 16 comprise an outer end cone housing 26 and an inner end cone housing 28. An insulating material 30 is positioned between outer end cone housing 28 and inner end cone housing 26. As discussed above, inner cone housing 28 is provided in prior art pollution control devices to retain insulating material 30 in position and to prevent insulating material 30 from being damaged by hot exhaust gases passing through the pollution control device. However, the use of inner cone housing 28 adds additional weight, complexity and cost to the pollution control device. It is therefore desired to make the use of inner cone housing 28 unnecessary.

The present invention provides a free-standing internally insulating liner, and in particular an insulating end cone that does not require use of inner cone housing 28. In particular, the present invention utilizes a refractory material to provide an inner insulating cone which is resistant to damage caused by exhaust gases as well as resistant to damage caused by mechanical and thermal shock. The useful refractory materials are capable of withstanding large gradients in temperature over short periods of time without shattering. Temperature gradients can vary from sub-zero temperatures to over 300° C. over the short period of time when a vehicle is started until it reaches cruising speed. The present invention uses a composite material having sufficient rigidity to withstand erosion from exhaust gases, and which also provides mechanical and thermal shock resistance.

The composite material comprises inorganic fibers and/or inorganic particles. The composite may optionally include one or more additional binders.

Fibers useful in the practice of the invention include fibers made from alumina-boria-silica, alumina-silica, alumina-phosphorus pentoxide, zirconia-silica, zirconia-alumina, and alumina. The fibers can be formed by processes known in the industry such as by blowing or spinning. A useful process is spinning of a sol gel solution. Useful fibers are commercially available under the tradenames SAFFIL from ICI Chemicals & Polymers, FIBERMAX from Unifrax Co., ALCEN from Denka, and MAFTECH from Mitsubishi.

The fibers can be used as fibers or they may be used as a fibrous mat. A mat of fibers can be formed by blowing the fibrous material onto a collection screen as is practiced in the nonwoven industry. A useful commercially available fiber mat is SAFFIL LD alumina fiber mat from ICI Chemicals & Polymers.

The cone can also be formed from inorganic particulate materials such as clays, ceramic or glass powders, ceramic or glass beads, and hollow ceramic or glass spheres. Additionally, combinations of fibers and particulates can be used.

The fibers and particles can act as binders. When the fibers and/or particles are heated to elevated temperatures, e.g., over 500° C., they can melt or be softened sufficiently to bond to other fibers and particles in the cone. The fibers and particles can also be sintered. By selecting fibers or particles having different melting points, it is possible to achieve various modes of bonding them together. For example, a combination of glass fibers and ceramic fibers can bond because the glass fibers soften and can melt at temperatures lower than the melting temperatures of the ceramic fibers. Additionally, the ceramic fibers can be sintered to other ceramic fibers without substantial melting of the fibers.

It may be useful to add other binders to assist in processing or to provide more strength at elevated temperatures. Organic binders can be used to hold the inorganic materials together at room temperature to form the cone. When the cone is heated above about 300° C., the organic binder burns off leaving the cone which can then be fired at elevated temperatures to sinter the inorganic materials together. Organic binders are particularly useful for molding and injection molding processes. Useful organic binders include low melting temperatures waxes and polyethylene glycol.

Inorganic binders can also be used. These binders include sol and sol-gel materials such as alumina sols, colloidal silica suspensions, refractory coatings such as silicon carbide suspensions, and solutions such as a monoaluminum phosphate solution. Colloidal silica suspensions are commercially available from Nalco Co. under the NALCO tradename.

The inorganic binders can be incorporated into the cone by adding the binders to the composition for forming the cone, infiltrating a formed cone with the sol or suspension, or by brushing a refractory coating or solution onto a surface of the cone. Inorganic binders help to stiffen the cones. When a binder solution or coating is applied only to one surface of the cone, e.g. the inside surface, the inside surface becomes more rigid while the outer surface can remain compressible. In use, the binders on the surface can help prevent erosion of the cone from hot exhaust gases.

Other adjuvants may also be included to aid in processing such as dispersing aids, wetting agents, thickness, and the like.

As described below in the Examples, the free-standing fibrous end cone may be formed in a variety of manners such as with a flexible mold, slush molding, press molding, or injection molding. Mats of fibers can also be formed in a manner similar to papier-mache in which strips of the fibrous mat are saturated in a binder solution and laid in overlapping fashion on a conical surface. As detailed below, each of these methods of forming a free-standing fibrous end cone results in a cone which is resistent to damage from exposure to hot exhaust gases, thermal shock, and road shock.

Figure 2:
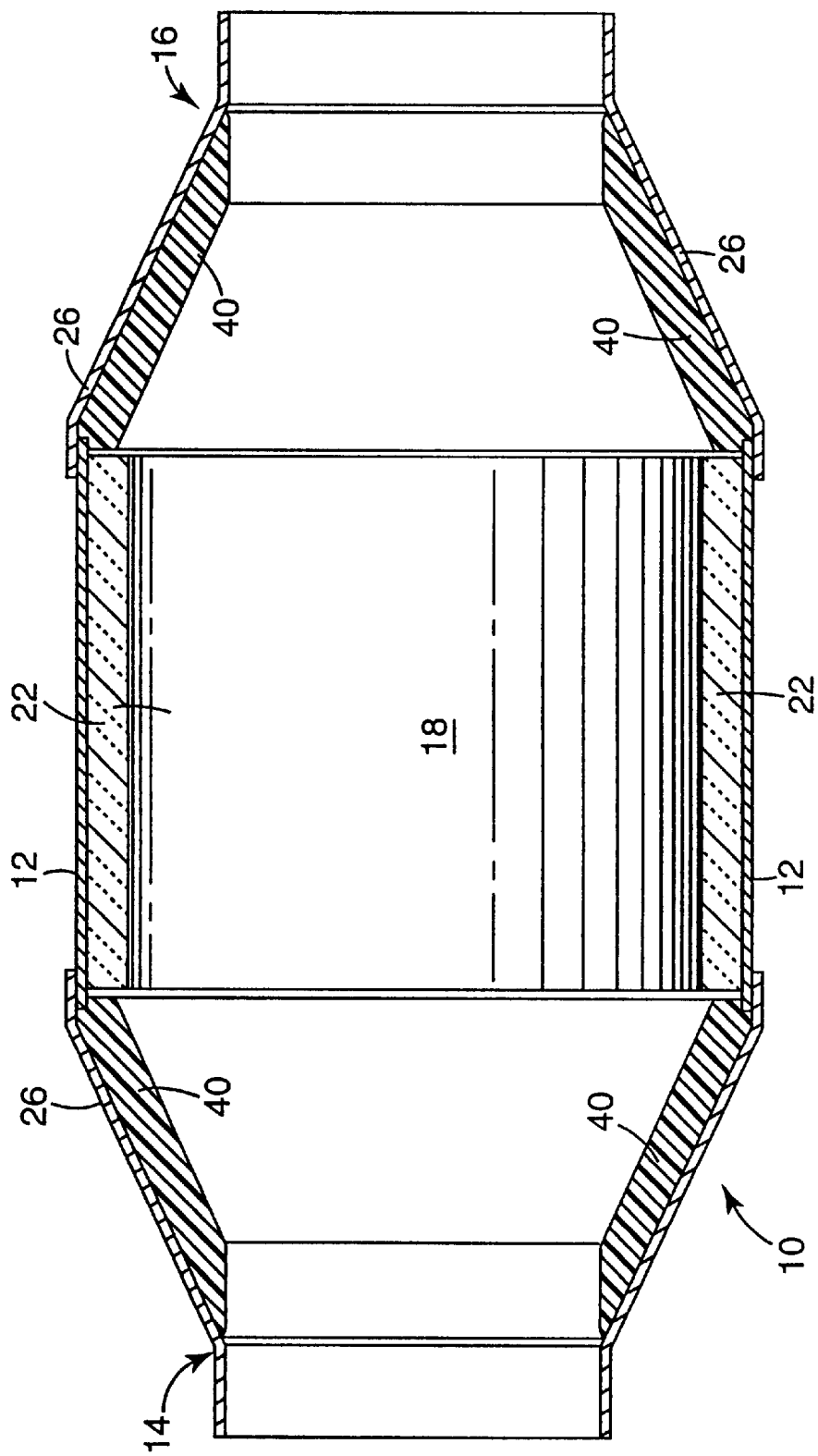
FIG. 2 is a cross-sectional view of a catalytic converter utilizing the end cone of the present invention.
Figure 3:
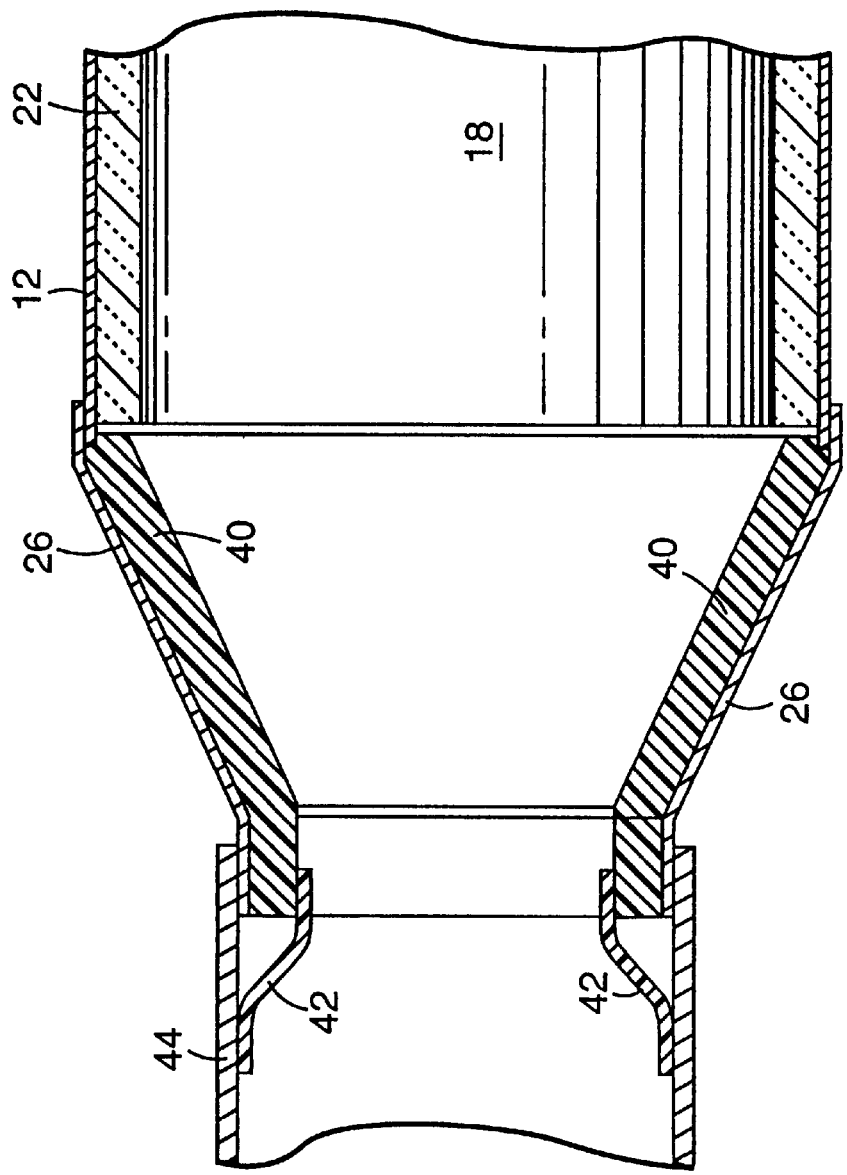
FIG. 3 is a cross-sectional view of an alternative embodiment of the end cone of the present invention.

The end cone is typically secured within an outer metal end cone. The metal end cone is made of high temperature resistant metals such as stainless steel and Inconel. The end cone may be secured within the outer metal end cone housing 26 of a pollution control device in a variety of manners. For example, as seen in FIG. 2, fibrous end cone 40 is compressed against monolith 18 and mounting mat 22 such that the fibrous end cone 40 is restrained from movement. Alternatively or in addition to such a frictional engagement, tabs 42 could be used to restrain fibrous cone 40 within an outer end cone housing 26, as illustrated in FIG. 3. Tabs 42 are shown extending from exhaust pipe 44, but could also extend from outer end cone 26 or casing 12, for example. Instead of individual tabs 42 as seen in FIG. 3, a solid retaining ring (not shown) could also be used. Of course, fibrous end cone 40 could be restrained within outer end cone 26 in a variety of other manners, depending upon the particular application desired by the user.

Objects and advantages of this invention are further illustrated by the following examples, but the particular materials and amounts thereof should not be construed to unduly limit this invention. All parts and percentages are by weight unless stated otherwise. Although the Examples pertain to an insulating end cone for use with a catalytic converter, the present invention is equally applicable for use in other areas of an exhaust system, such diesel particulate filters or traps, exhaust manifolds and exhaust pipes. The usefulness of the invention is likewise not limited to the conical shape of the Examples, but rather is useful in any high temperature application where an inner insulating liner is required and the use of a separate inner protective surface is not desired.

Test Procedures

Hot Shake Test

The Hot Shake Test is used to evaluate an end cone for use with a catalytic converter by subjecting a catalytic converter with the end cone to vibration and hot gas from either a gasoline engine (Mode 1) or hot air (Mode 2). The two test modes are discussed more fully below.

MODE 1—A catalytic converter, with the end cone mounted securely within it, is attached to a solid fixture atop a shaker table (Model TC 208 Electrodynamic Shaker Table from Unholtz-Dickie Corp., Wallingford, Conn.). The catalytic converter is then attached through a flexible coupling to the exhaust system of a Ford Motor Co. 7.5 liter displacement V-8 gasoline powered internal combustion engine coupled to an Eaton 8121 Eddy-current dynamometer. The converter is tested using an inlet exhaust gas temperature of 900° C. at an engine speed of 2200 rpm with a 30.4 kg-meter load, while shaking the converter at 100 Hz and 30 g's acceleration on the shaker table. The converter is tested under these conditions for 25 hours. The converter is then disassembled and the end cone examined visually for signs of disintegration, erosion, and cracking. For a successful test, the end cone should be intact and exhibit no visible damage.

MODE 2—This test mode is conducted in a manner similar to test Mode 1. A catalytic converter and end cone are mounted to a shaker table (available from Unholtz-Dickie) which shakes the converter with an acceleration of 30 g's at a frequency of 100 Hz. The heat source is a natural gas burner which supplies an inlet gas temperature of 900° C. The converter is subjected to three cycles of heating and cooling (during vibration), where a cycle includes a heating period to attain a gas inlet temperature of 900° C., maintaining the inlet gas temperature at 900° C. for an 8-hour period, and cooling to ambient temperature (about 21° C.). As in Mode 1, the end cone should not exhibit any visible signs of damage.

EXAMPLE 1

Example 1 illustrates how a ceramic fiber end cone was prepared using a flexible mold and a fiber mixture having an organic binder. (The same composite mixture could also be injection molded).

A rubber mold was prepared by mixing 10 parts of a room temperature curing rubber (SILASTIC K RTV Silicone Rubber Base available from Dow Corning Co.) and 1 part curing agent (SILASTIC K RTV Curing Agent available from Dow Corning Co.). The rubber mixture was molded around a steel cone master having the desired finished dimensions of the fiber cone. The mold was cured for 24 hours at room temperature (approximately 21° C.).

Glass fibers (6.35 mm long S-2 Glass Fibers available from Owens-Corning Fiberglas Corp.) were heat cleaned and crushed to a fiber length of about 0.5 mm. Ceramic fibers (SAFFIIL ceramic fibers from ICI Chemicals & Polymers Ltd.) were milled to a length of about 0.25 mm. A mixture fibers was prepared by mixing 37.8 grams each of the crushed glass and ceramic fibers. The fiber mixture was then poured into a planetary mixer (Model LDM-1 gallon Ross mixer available from Charles Ross & Son Co.) containing 150 grams of binder (polyethylene glycol 1000 m.w. available from Aldrich Chemical Inc.) and 0.75 gram of a dispersing aid (KD-5 dispersant available from ICI Americas). The mixture was heated to 100° C. in the mixer to melt the binder, and then mixed under a vacuum of 25 mm Hg for about 30 minutes. The resulting fiber-binder mixture was poured into the rubber mold which had been heated to 40° C. The filled mold was then placed in a vacuum chamber affixed to a vibrating table (SYTRON vibration table from FMC Corp.) The vacuum chamber was evacuated to 30 mm Hg, and the table was vibrated for 5 minutes to de-aerate the mixture and to enhance the flow of the mixture into the mold. The mold was then removed from the vacuum chamber and cooled to room temperature. The hardened fiber cone was removed from the mold, packed in a bed of hollow alumina beads (1.5 mm diameter beads available from Microcel Technologies, Inc.), and heated to 250° C. for about 3 hours. The beads were used to prevent the cone from slumping and becoming deformed while a substantial portion of the binder baked out. The cone was then removed from the bed and fired in a kiln at 1100° C. for 4 hours to bond the fibers in the cone. The cone was cooled to room temperature, inserted into a metal cone housing for a catalytic converter, and subject to the Hot Shake Test—Mode 2 described above. After testing, the cone was found to be intact and exhibited no cracking or other visible signs of erosion or disintegration.

EXAMPLES 2–4

Examples 2–4 illustrate how a ceramic end cone was prepared using a slurry of water and ceramic fibers. For each of Examples 2–4, a conical mold was prepared by cutting and fabricating a sheet of perforated sheet metal to the shape of a catalytic converter end cone. The mold was then covered with a wire screen (25 mesh). The large diameter end of the cone is sealed by taping the end shut with filament tape, and the small diameter end of the mold was attached to a 3.8 mm diameter vacuum hose of a vacuum cleaner (Shopvac available from Sears).

For Example 2, a slurry was prepared by mixing 14 liters of tap water, 200 grams of ceramic fibers (7000M ceramic fibers available from Unifrax Co., Niagara Falls, N.Y.) with an air mixer for about 10 minutes. With continued mixing, 2 liters of a colloidal silica suspension (NALCO 2327 available from Nalco Chemical Co.) were added and dispersed.

The mold was then placed in the slurry and the vacuum was turned on for approximately 5 seconds. The mold was immediately removed after the vacuum was turned off, and a 6.3 mm thick layer of fibers had been deposited on the cone. The fiber cone was removed from the mold and dried at 100° C. for about 2 hours.

Fiber cones for Examples 3–4 were prepared as for Example 2, except that a coating was applied with a brush to the inside surface of each cone. The coatings of Examples 3–4 made the inner surfaces of the cones more rigid while the outer surfaces of the cones remained compressible. In addition to the coatings which were used in Examples 3–4, it is also contemplated that other coatings such as a Silicon Carbide suspension (available from ZYP Coatings, Inc.) could also be used. The coatings for each example were as follows:

Example 3 Colloidal silica suspension (Nalco 2327)
Example 4 Monoaluminum phosphate (50% Solution, Technical Grade available from Rhone-Poulenc Basic Chemical Co.)

The cones of Examples 2, 3, and 4 were tested using the above described Hot Shake Test—Mode 2, and did not exhibit any cracking, disintegration, or erosion.

EXAMPLE 5

Example 5 illustrates how a ceramic end cone was prepared using a ceramic fiber mat material. A ceramic fiber mat (SAFFIL Type LD Mat available from ICI Chemicals and Polymers) was cut into strips measuring approximately 5.1 cm by 10.2 cm. The strips were dipped into a colloidal silica suspension (NALCO 2327), and applied on the inside surface of an outer metal cone portion of a catalytic converter. (The outer end cone acted as a forming mold). The strips were overlapped and layered to form cone having a thickness of about 6.35 mm. An inner cone of the catalytic converter (acting as an interior mold for the strips) was then forced over the layers to sandwich the layers of mat material between the exterior and interior metal end cones. The assembly was dried at 100° C. for approximately 5 hours in an air oven. The inner metal cone was then removed, and the outer metal cone with the layered mat was heated to 900° C. for about 1 hour to form a rigid fiber cone. The fiber cone was then removed and subjected to the Hot Shake Test—Mode 1. The cone did not exhibit any cracking, disintegration, or erosion.

The test results of Example 1–5 demonstrate that the free standing fiber composite end cone can withstand the exhaust gas flows and the vibrational shaking of an exhaust aftertreatment environment.

In addition to the Examples provided herein, it is also contemplated that the free-standing fiber end cone may also be formed by additional methods, such as injection molding.

Although the present invention has been described with reference to preferred embodiments, workers skilled in the art will recognize that changes may be made in form and detail without departing from the spirit and scope of the invention.

What is claimed is:

1. A pollution control device for purifying exhaust gas from an internal combustion, the pollution control device comprising:

a housing;

a pollution control element disposed within the housing;

a resilient mat positioned between the housing and the pollution control element;

an end cone connecting the housing to an exhaust pipe of an internal combustion engine; and insulating cone having an inner surface and an outer surface, the insulating cone comprising inorganic materials including at least one of inorganic fibers and inorganic particulate, the insulating cone positioned within the end cone, such that a substantial portion of the inner surface of the insulating cone is exposed to the flow of exhaust gas from the internal combustion engine, the inorganic materials of the inner surface of the insulating cone being bonded together by melting, sintering, or softening of the materials so as to form a rigid surface that can sufficiently withstand erosion from exposure to such exhaust gas flow.

2. The pollution control device of claim 1, wherein the insulating cone includes a fibrous binder.

3. The pollution control device of claim 2, wherein the insulating binder is ceramic fibers.

4. The pollution control device of claim 1, wherein the insulating cone is formed from an inorganic fibrous material.

5. The pollution control device of claim 1, wherein the insulating cone includes at least one inorganic fiber selected from the group consisting of alumina-boria-silica, alumina silica, alumina-phosphorus pentoxide, zirconia-silica, zirconia-alumina, and alumina.

6. The pollution control device of claim 1, wherein the insulating cone includes at least one inorganic particulate selected from, the group consisting of clays, ceramic powders, glass powders, ceramic beads, glass beads, hollow ceramic spheres, and hollow glass spheres.

7. The pollution control device of claim 1, wherein at, least one of the inorganic fibers and inorganic particulate are sintered together.

8. The pollution control device of claim 1, wherein said insulating cone includes inorganic binders.

9. The pollution control device of claim 8, wherein said inorganic binders are selected from the group consisting of sol and sol-gel materials.

10. A pollution control device for purifying exhaust gas from an internal combustion engine, the pollution control device comprising:

a housing;

a pollution control element disposed within the housing;

a resilient insulating mat positioned between the housing and the pollution control element;

an end cone for connecting the housing to an exhaust system of an internal combustion engine; and a layer of insulating material positioned within the end cone, the insulating material comprising at least one inorganic material including inorganic fibers and inorganic particulate, the inorganic material exposed to the exhaust gas of the internal combustion engine being sufficiently rigid to withstand erosion from the exhaust gas flow.

* * * * *

UNITED STATES PATENT AND TRADEMARK OFFICE
CERTIFICATE OF CORRECTION

PATENT NO. : 6,726,884 B1
DATED : April 27, 2004
INVENTOR(S) : Dillon, Kenneth R.

It is certified that error appears in the above-identified patent and that said Letters Patent is hereby corrected as shown below:

Title page,
Item [56], References Cited, OTHER PUBLICATIONS, "ICI Chemicals & Polymers Limited" reference, delete "Catalytic Converters- Refractory Fibre Retaining Blakets US 4,69,338 Validity", insert in place thereof -- Catalytic Converters– Refractory Fibre Retaining Blankets US 4,693,338 Validity --;

Column 5,
Line 55, delete "SAFFIIL", insert in place thereof -- SAFFIL --;
Line 57, after "mixture" insert -- of --;

Column 6,
Line 29, delete "is", insert in place thereof -- was --;

Column 8,
Line 9, delete "insulation", insert in place thereof -- fibrous --;
Line 20, after "from", delete ",";
Line 23, after "at" delete ",".

Signed and Sealed this

Twenty-fourth Day of August, 2004

JON W. DUDAS
*Director of the United States Patent and Trademark Office*